United States Patent [19]

Rist

[11] Patent Number: 4,984,849

[45] Date of Patent: Jan. 15, 1991

[54] COVER FOR AUTOMOTIVE SEAT RESTRAINT SHIELD

[76] Inventor: Judith A. Rist, 11725 N. 83rd Pl., Scottsdale, Ariz. 85260

[21] Appl. No.: 389,344

[22] Filed: Aug. 3, 1989

[51] Int. Cl.⁵ .................... A47C 1/08; A47D 13/08
[52] U.S. Cl. .................................. 297/482; 297/250
[58] Field of Search .............. 297/250, 487, 488, 218, 297/219

[56] References Cited

U.S. PATENT DOCUMENTS

| | | | |
|---|---|---|---|
| 4,342,483 | 8/1982 | Takada | 297/250 X |
| 4,376,551 | 3/1983 | Cone | 297/250 |
| 4,540,219 | 9/1985 | Klinger | 297/487 |
| 4,695,092 | 9/1987 | Hittie | 297/250 X |
| 4,738,489 | 4/1988 | Wise et al. | 297/250 X |
| 4,768,828 | 9/1988 | Kohketsu | 297/250 |

Primary Examiner—Peter A. Aschenbrenner
Attorney, Agent, or Firm—Gregory J. Nelson

[57] ABSTRACT

A soft, protective cover for an infant vehicle car restraint shield which has an opening so it may be slipped over the shield. The front of the cover carries decorative indicia such as an animal face with a three-dimensional projection which may be grasped by the infant to provide both an audible and tactile response to entertain the restrained infant.

5 Claims, 1 Drawing Sheet

U.S. Patent  Jan. 15, 1991  4,984,849
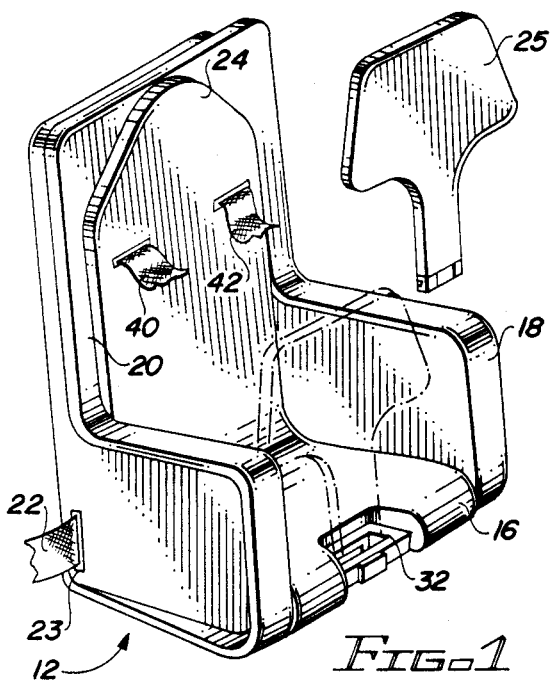
FIG. 1
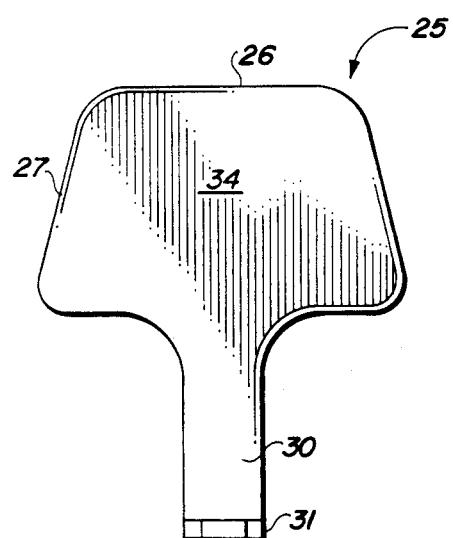
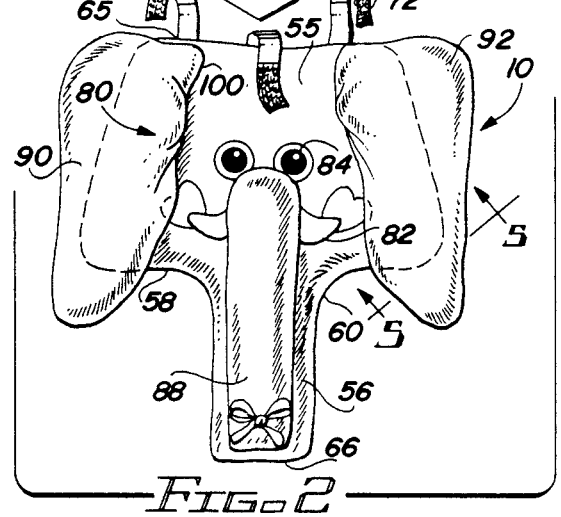
FIG. 2
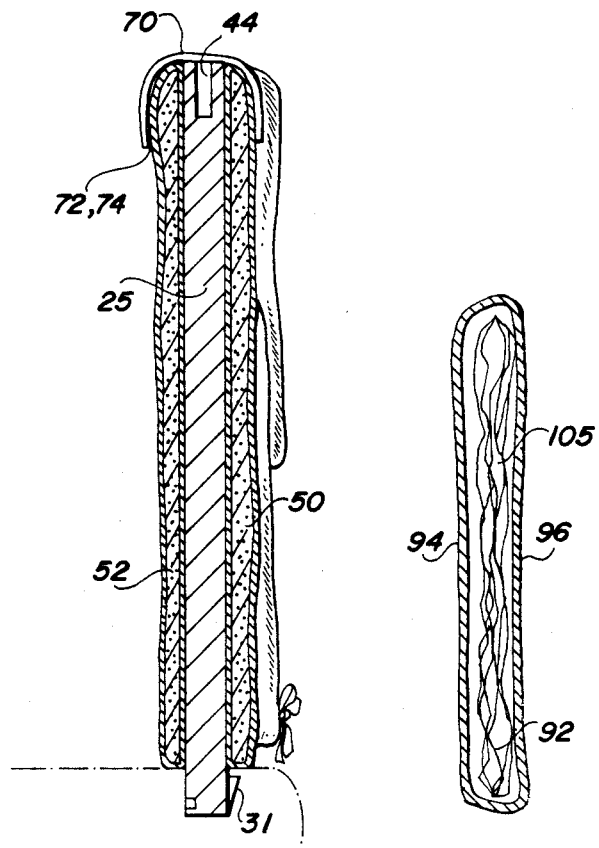
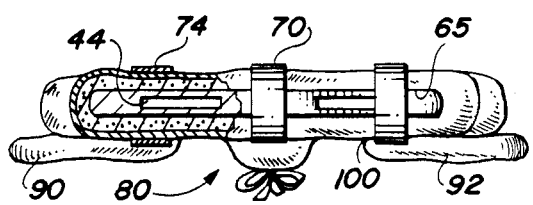
FIG. 4
FIG. 3   FIG. 5

COVER FOR AUTOMOTIVE SEAT RESTRAINT SHIELD

The present invention relates to a cover or shield or more particularly relates to a cover for the shield of an infant seat restraint of the type commonly used in vehicles.

Vehicle seat restraints for protecting and restraining infants and toddlers in the case of sudden stops or impacts are widely used and, in fact, are mandated by the laws of many states. These car seat restraints generally include a shield which is secured to the seat portion of the restraint and extends to the chest area of the child and are securable to a restraint harness or straps. Generally the shield is fabricated from metal or a hard impact-resistant plastic or a combination of these two materials. This type of construction places a hard surface adjacent the child and which may be uncomfortable to the child. Further, the hard plastic or metal may become uncomfortably hot or cold in the vehicle after the vehicle has been exposed to the elements for a period of time. For example, in a desert climate, car interior temperatures may reach in excess of 160 degrees Fahrenheit. Therefore, placing a child in a seat restraint adjacent a hot surface may irritate or burn the child's skin which comes into contact with the hot surface. Even if no irritation or burn results, the excessively hot or cold surface may cause the child to become uncomfortable and unhappy which condition is manifested by the child in several ways which usually involves crying, screaming, yelling, kicking or a combination of these activities. This manifestation is stressful to the parent or attendant, particularly if the parent or attendant is trying to maneuver the vehicle through traffic.

Accordingly, in the interest of promoting a harmonious parent/child relationship and further to provide for the comfort and entertainment of the child, there exists a need in the prior art for an effective, protective cover for car seat restraint shields.

Briefly, in accordance with the present invention, a vehicle restraint shield cover is provided having a front and rear panel of soft material such as terry cloth configured in a general shape conforming to the shape of the shield. The panels define an opening which allows the cover to be slipped about the shield. Once the cover is in position on the shield, the shield may be secured in place to the restraint seat. One or more fasteners may be provided at the opening defined by the panels. Preferably, the front panel of the cover is provided with appropriate decorative indicia such as a caricature or fanciful, three-dimensional representation of an animal or cartoon character. The cover also includes projecting members positioned for easy manipulation by the restrained infant which members provide a tactile and audible sensation to occupy and entertain the child. In the instance of a representation of a cartoon character or animal face, the projecting members are generally in the form of an appendage such as the ears associated with the animal or cartoon character face which ears contain a soft "crinkle" material that may be crushed and manipulated by the child.

The above and other objects of the present invention will become more apparent from the following description, claims and drawings in which:

FIG. 1 is a perspective view of a representative vehicle restraint seat;

FIG. 2 is a front view of the shield and shield cover prior to installation of the cover about the shield;

FIG. 3 is a vertical cross-section showing the shield and installed cover;

FIG. 4 is a top view of the shield and installed cover; and

FIG. 5 is a sectional view taken along line 5—5 of FIG. 2.

Turning now to the drawings, the cover of the present invention is generally designated by the numeral 10 and is for use in connection with a vehicle restraint 12 as seen in FIG. 1. The restraint 12 is representative of restraints of the general type having a body 14 of impact-resistant material such as plastic defining a seat 16, arms 18 and back 20 for supporting and restraining the child in a seated position. The body 14 is securable to a vehicle or automobile seat usually by means of the restraint belts 22 which are a normal part of most vehicles and which attach or extend through a slotted portion 23 of the restraint. The restraint seat is generally covered by a resilient padding 24.

The child is secured in the restraint by a shield 25 having a top edge 26, opposite sides 27 and 28 defining the body 34 of the shield. A downwardly extending arm 30 terminates at a latch 31 which locks to the seat body at receptacle 32. The shield is normally metal or plastic or a combination of these materials and in the locked position the body 34 assumes a position immediately adjacent the chest area of the restrained child. Belts or harness-type restraints 40, 42 extend from the seat back over the shoulder area of the child and are placed in locking engagement at receptacles 44 at the upper edge of the shield.

As mentioned above, the shield 25 is fabricated from a hard plastic or metal material and may become extremely hot or cold if the vehicle is left unoperated for a period of time exposed to weather conditions. If a child is placed in the seat and the shield locked in place in such conditions, the child may be at least temporarily discomforted by the hot or cold shield. Further, the hard surface itself may be uncomfortable or foreign to the child. Restraint cover 10 is provided for the comfort and safety of the child as well as for the entertainment of the child.

The cover 10 includes a front panel 50 and a rear panel 52. The front and rear panel each have a larger upper body section 55 and a central downwardly extending tongue 56 conforming to the general shape of the shield. The front and rear panels are joined along opposite side edges 58 and 60 leaving transversely extending opening 65 along the top edge of the construction and a narrower transversely extending opening 66 at the bottom of the downwardly extending projection 30. Preferably, the front and rear panels are of a suitable soft, resilient fabric material such as a quilted terry cloth which will both serve as a cushion to the restrained child and also protect and insulate the child from excessively cold or hot surface temperatures of the shield. Fasteners are provided along the upper opening 65 and may be cooperating snap members or preferably as shown may consist of flexible straps 70 having one end sewn to one of the panels. The straps preferably have one element 72 of a loop and hook fastener on their inner side and a cooperating element 74 of the loop and hook fastener is secured to the opposite panel adjacent the opening. Thus, the strips may be attached to form a loop over the opening 40 as best seen in FIGS. 3 and 4. This construction permits easy access to the upper edge of the shield for securement of the restraint belts 40 and 42 at the receptacles 44.

In order to add to the aesthetics of the cover and to provide an element of interest to the child, an appropriate design feature 80 is applied at least to the surface of the front panel 50. As shown, the design element is preferably a representation of a cartoon character or the face of an animal which may be a bear, rabbit or, as is shown, an elephant. In this case, the design 80 includes tusks 82, and eyes 84 which are printed or appliqued to the surface of the panel. In addition, a three-dimensional tubular member representing or simulating the trunk 88 of an elephant is also attached to the panel to provide an additional attraction element for the child.

The design on the front panel includes projections 90 and 92 which are configured in the shape of the animal's ears. The ear-like projections have a rear panel 94 which is preferably roughly textured of a fabric material such as terry cloth. The front panel 96 of each of the ear-like projections is a smoother material such as cotton or plastic material and the two are peripherally joined together and are stitched or otherwise joined to the front of the cover at 100. The interior area between the front and rear panels of each of the ears 90, 92 contains an insert 105 for the entertainment of the child. The insert 105 preferably is a plastic or other smooth material which when rubbed, folded or crumpled provide an audible "crinkling" sound. It will be noted that the ear-like projections of the shield cover are positioned in an area easily accessible to the hands of the child so when the child grasps or fondles the floppy ear-like projections, the child is provided with the contrasting tactile experience of both a rough and smooth surface and also is provided the audible response of the crinkly sound that results from the child crumpling or rubbing the insert 105. This will entertain and occupy the infant while the parent or attendant operates the vehicle.

In use, the car shield 25 is removed by unlocking it from the restraint seat at latch member 32. The cover 10 is installed over the shield by detaching one end of the fastener straps 70 by separating the loop and hook components. As seen in FIG. 2, the shield is inserted into the cover through the upper opening 65 with the tongue-like extension 30 of the shield extending from the lower opening 66 of the cover. Fastener straps 70 are resecured across the opening 65 and the shield secured in place at latch 32. The cover is positioned with the decorative indicia 80 facing outwardly and the soft inner panel 52 adjacent the child to protect and cushion the restrained child. The restraining straps 40, 42 may be secured to the upper edge of the shield at receptacles 44 through the upper opening 65. With the cover in this position, the child is both cushioned and protected and the projecting ear-like members 90, 92 are positioned in easy grasp of the child for the child to play with to entertain and occupy the child.

The car seat shield cover of the present invention may be made of various shapes and design although the general configuration shown with the larger, upper portion of the downwardly extending tubular portion will fit most conventional car shields. The ear-like projections "crinkle" to entertain and occupy the child. The shield is of a fabric material which is easily removed and washable and may be returned to use as a cover for the shield. Various attractive designs may be applied to the front panel.

It will be obvious to those skilled in the art to make various changes, alterations and modifications to the car seat shield cover described herein. To the extent such changes, alterations and modifications do not depart from the spirit and scope of the appended claims, they are intended to be encompassed therein.

I claim:

1. A cover for a frontal shield of an infant vehicle seat restraint comprising:
    (a) a front and rear panel defining an opening configured so that the cover may be slipped over the shield with an outer surface of the front panel exposed;
    (b) decorative indicia in the form of a fanciful design of a face on the outer surface of said front panel;
    (c) a portion of said cover located in an area convenient to the grasp of the restrained infant including projections representative of ears associated with said face; and
    (d) said ear-like projections having a surface which is relatively smooth and another surface which is relatively rough defining a pocket-like construction, said pocket containing a material which crinkles to provide tactile and audible response when compressed.

2. The cover of claim 1 wherein said front and rear panels are soft fabric material.

3. The cover of claim 2 wherein said soft fabric material comprises terry cloth.

4. The cover of claim 1 including fastener means associated with said opening.

5. The cover of claim 1 further including a three-dimensional projection representative of a nose associated with said face.

* * * * *